United States Patent
Hodge

[11] Patent Number: 5,597,149
[45] Date of Patent: Jan. 28, 1997

[54] CLAMPING BASE

[75] Inventor: Robert Hodge, Grants Pass, Oreg.

[73] Assignee: Siskiyou Design, Inc., Grants Pass, Oreg.

[21] Appl. No.: 336,881

[22] Filed: Nov. 9, 1994

[51] Int. Cl.⁶ ....................................................... A47G 1/10
[52] U.S. Cl. .................... 248/316.4; 248/231.41; 248/286.1
[58] Field of Search ........................... 248/316.1, 279.1, 248/285.1, 286.1, 558, 159, 231.41, 316.4; 359/811, 822, 827, 829

[56] References Cited

U.S. PATENT DOCUMENTS

| 1,482,308 | 1/1924 | Lieberenz | 248/231.41 |
| 1,659,576 | 2/1928 | Brady | 248/316.4 |
| 2,812,918 | 11/1957 | Longino | 248/316.4 |
| 4,108,462 | 8/1978 | Martin | 248/286.1 |
| 4,711,422 | 12/1987 | Ibanez | 248/279.1 |
| 4,811,310 | 3/1989 | Wille | 248/286.1 |
| 5,039,043 | 8/1991 | Hodge | 248/125 |
| 5,116,008 | 5/1992 | Allen | 248/286.1 |
| 5,320,444 | 6/1994 | Bookwalter | 248/231.41 |

Primary Examiner—Leslie A. Braun
Assistant Examiner—Gwendolyn Wrenn
Attorney, Agent, or Firm—Lyon & Lyon

[57] ABSTRACT

A clamping mechanism for attaching a clamping base to a surface is disclosed. The preferred clamping base is elongated and has a longitudinal channel for receiving a fastener, preferably a screw. The fastener frictionally holds the clamping base to a surface. The clamping base further includes a hole having a slot for stable mounting of objects under study. The diameter of the hole is variable and is actuated by a clamping screw extending through a cavity in the clamping base.

9 Claims, 3 Drawing Sheets

CLAMPING BASE

FIELD OF THE INVENTION

This application relates to devices used for securely clamping items for experimentation, particularly for use with mechanical and optical benches, and for research in any field where stability is important.

BACKGROUND

There are many applications where it is necessary to perform various types of experiments that require that an object, or objects, be kept very stable for an extended period of time. To meet this need, specialized tables and clamps have been developed. A common way of holding an object is to clamp it to a horizontal surface such as an optical bench, a laboratory bench, or other type of bench. Commonly, these benches have various channels and threaded holes for mounting clamps and other mounting devices.

For many applications, the object under study must be mounted at a height above the bench. For example, testing of optical systems requires light to pass through the object without interference by the testing apparatus. To meet this requirement, various posts and spacers have been developed. As generally discussed in U.S. Pat. No. 5,039,043, posts and post holder arrangements have been used for precisely positioning optical components on an optical test table. Optical components, such as lenses, mirrors and lasers, must be precisely oriented with respect to each other in height and angular orientation. Typically, the optical components are held in a holder and mounted on a post and post holder arrangement.

FIG. 1 shows a post and post holder as it would appear on an optical table or breadboard. The optical table 10 is a rigid table which bears an array of threaded holes 12 on its surface. An optical component, such as a lens 14, is held in a holder having a threaded end 18, 16 which is in turn threaded onto a post 20 having a threaded end 21 held in a post holder 22. The post holder 22 is attached to the table via the threaded holes 12. Generally, such a post 20 and post holder 22 arrangement provides two degrees of freedom, vertical and rotational, about the axis of the post holder.

In order to move the optical component, the post 20 may be raised or lowered, or rotated about the axis of the post holder 22. The post is locked into place using a screw 24 inserted through the post holder 22 to contact the post 20, thereby frictionally holding the post 20 in place. The post holder 22 can generally be screwed directly into the threaded holes 12 in the bench 10, thus providing both an attachment to the bench 10 and vertical support for the object involved in the experiment.

Other current devices are found in the biological field. For example, when doing in vitro fertilization or other procedures where micron scale mechanical precision is required, various jigs or fixtures have been used. However, these devices have tended to be of the "jury-rigged" variety, and lack mechanical soundness.

A drawback of the mounting system illustrated by FIG. 1 is that it is relatively inflexible once it is placed on the bench. For example, the post 20, holder 16 and lens 14 can only be rotated about the post holder 22 axis or moved vertically with respect to the bench 10. Moving the lens 14 horizontally (e.g., to another threaded hole 12) requires disassembly of the post 20 and post holder 22, movement of the post holder 22, and reassembly of the post 20 and post holder 22. Such movement is less than optimal for the following reasons.

First, it is time consuming to disassemble and reassemble the device—especially where this must be done repeatedly. Second, many times the bench can become crowded, making it difficult to access the post 20 and post holder 22. Third, when loosening the screw 24, it is possible for the post 20 to suddenly slip downward when the screw is withdrawn sufficiently. This problem is addressed in the above-mentioned U.S. Pat. No. 5,039,043.

Apart from the time and access problems noted above, the illustrated system suffers performance deficiencies. First, the screw can scratch or score the post 20, making it necessary to replace the post 20. Second, the system can lead to accuracy problems due to even minor changes in location of the lens due to tightening the screw 24, which can skew the post 20 to one side of the post holder 22.

The biological mounting arrangements are further deficient because the object under operation is typically located in front of the holder. Since the object is adjacent the fixture, access to the fixture is limited, especially where modification requires access to the portion of the fixture adjacent the object.

SUMMARY OF THE INVENTION

The present invention provides an improvement on the aforesaid system by providing a flexible and easy-to-use clamping base that solves the performance problems noted above. The preferred embodiment of the current invention combines a flexible mounting system for mounting to a bench (directly or indirectly) and a mounting system for mounting a post or other similar mounting hardware, or mounting an object directly.

The preferred mounting clamp is generally oval shaped and has a longitudinal channel having a flange for accepting a channel screw. The channel screw may be used to mount the clamping base to the bench or other mounting hardware. The preferred mounting base further comprises a bored hole located proximate a clamping end, whereby said bored hole is defined by a jaw and having a slot extending radially from the axis of said hole. A clamping screw extends longitudinally from an adjustment end of the clamp, through the clamp slot, and into the jaw. The diameter of the bored hole may be adjusted by rotating the clamping screw, thereby drawing the jaw toward the adjustment end and reducing the width of the clamp slot. The effect is that the clamping base may grip an object or a post by squeezing around the exterior of the post.

Advantageously, the longitudinally extending clamping screw is accessed at the end of the clamp placed away from the object. In this way, access to the clamp is improved.

Accordingly, it is an object of the present invention to provide an improved clamping base.

BRIEF DESCRIPTION OF THE DRAWINGS

This and other objects of the present invention will become better understood through a consideration of the following description taken in conjunction with the drawings in which.

DETAILED DESCRIPTION

Figure 2:
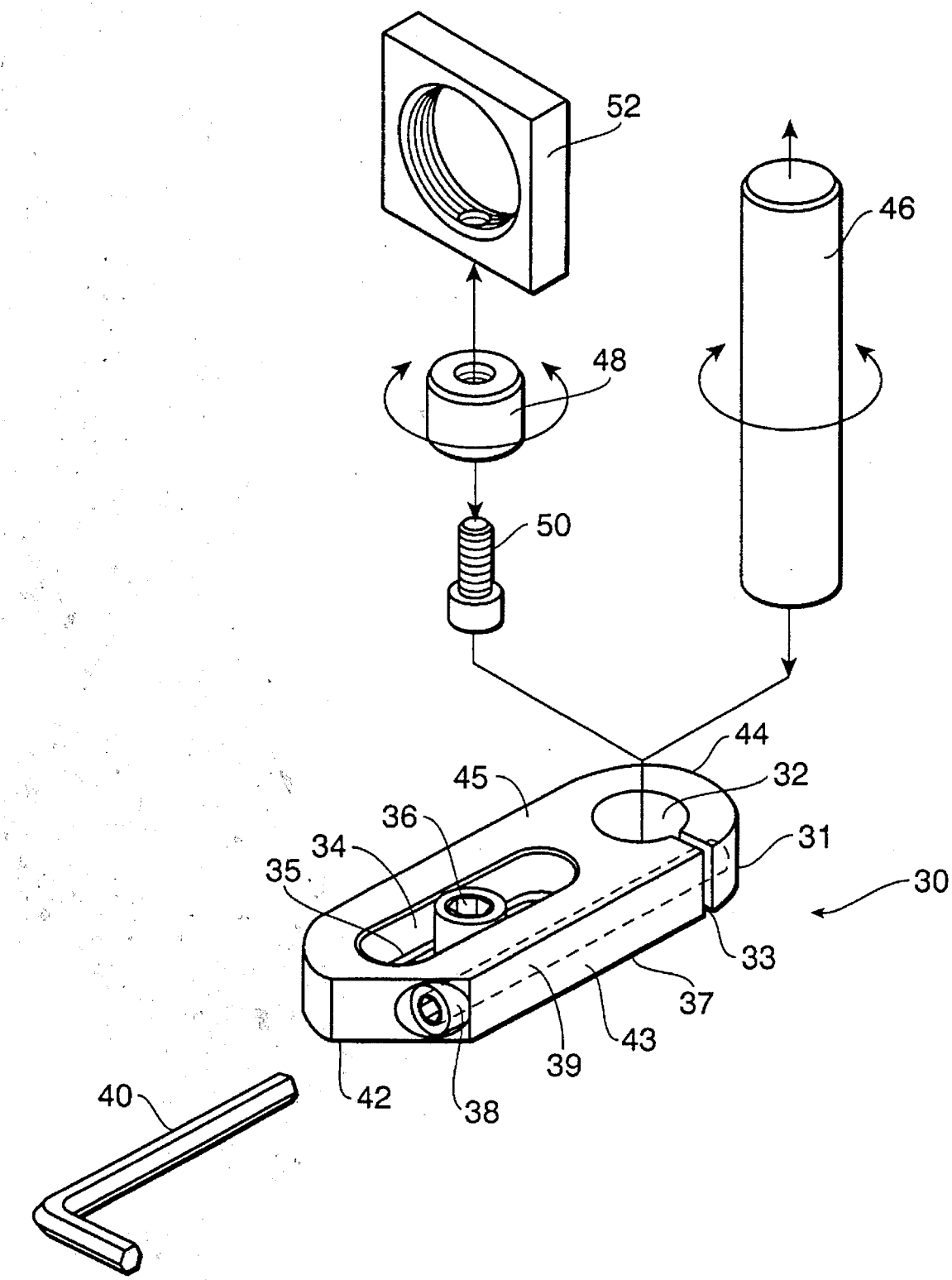
FIG. 2 is a perspective view, showing the preferred clamping base, an Allen wrench, and two possible mounting applications.

Turning now to the drawings, FIG. 2 depicts the preferred embodiment of the clamping base 30. FIG. 2 also shows two exemplary mounting devices that may be used in conjunction with the clamping base, a post 46 and a short post 48. These posts, and the associated hardware, are more fully described in U.S. Pat. No. 5,039,043, incorporated herein by reference.

The perimeter of the preferred clamping base 30 (generally referred to herein as a clamping base or clamp) is defined by a static side 45, a slot side 43, a clamping end 44, and an adjustment end 42. The clamp 30 is formed generally in the shape of an elongated oval. There are two mechanisms for attaching the clamp 30 to a surface or to other devices.

The first attachment allows the clamp 30 to be mounted on an optical bench or other surface as known in the art. The preferred mounting system comprises a longitudinal channel 34 having a flange 35. The channel 34 is preferably located substantially near the adjustment end 42 of the clamp 30. The flange 35 is located on an inner perimeter of the channel 34 and on a lower surface 37 of the preferred clamp 30. A channel screw 36 may be used in conjunction with the channel 34 to mount the clamp 30 to the bench. The preferred screw has a head that is sized to fit within the channel 34 but not through the flange 35, allowing only the threaded portion to pass through the flange 35. The preferred screw 36 can be actuated using an Allen wrench, or can have other heads as are well known in the art. The clamp 30 can thus be attached to a surface or other device due to the downward force applied by the channel screw 36 on the flange 35.

The second attachment allows attachment of objects to the mounting clamp 30. It comprises a bored hole 32 located substantially near the clamping end 44 of the clamp 30. The preferred hole 32 has the same axis as the outer perimeter of the clamping end 44 of the clamp 30. A clamp slot 33 extends radially from the axis of the bored hole 32 and separates the clamping end 44 from the slot side 43, forming a jaw 31. A clamping screw 38 extends longitudinally through a cavity 39 on the slot side 43 of the clamp 30. The head of the clamping screw is located substantially near the adjustment end 42. The threaded portion of the clamping screw extends from the adjustment end 42, through the slot 33, and into the jaw 31. Rotation of the clamping screw 38 causes the jaw 31 to move and either narrow or enlarge the slot 33, depending on the direction of rotation. The effect of this rotation is to enlarge or narrow the diameter of the bored hole 32 so that a post or other device can be grasped. The preferred clamping screw has a head that will accept an Allen wrench 40, or can have other heads as are well known in the art. The preferred clamping base 30 is constructed of aluminum, although other metals (including stainless steel), plastics or composites could be used.

A straightforward application using the clamp 30 is shown in FIG. 2, where the clamp 30 is mounted horizontally on a bench (not shown) and tightened down using the channel screw 36. Two alternative mounts are shown. The first is a simple post 46. The post may be inserted into the bored hole 32. Devices such as the clamp 30 and the post 46 are manufactured with extremely tight tolerances, so that the outer diameter of the post 46 is very near to the inner diameter of the bored hole 32. The preferred hole-to-post tolerance is a maximum of +0.003 inch to −0.000 inch. Tightening the adjustment screw 42 results in the jaw 31 closing around the post 46 to firmly secure the post 46 in place. The screw 42 can be incrementally adjusted so as to allow just enough force to hold the post 46 in place, yet allow manual adjustment with an operator's fingers. The post 46 can be raised and rotated to change the position of the object under study.

Figure 1:
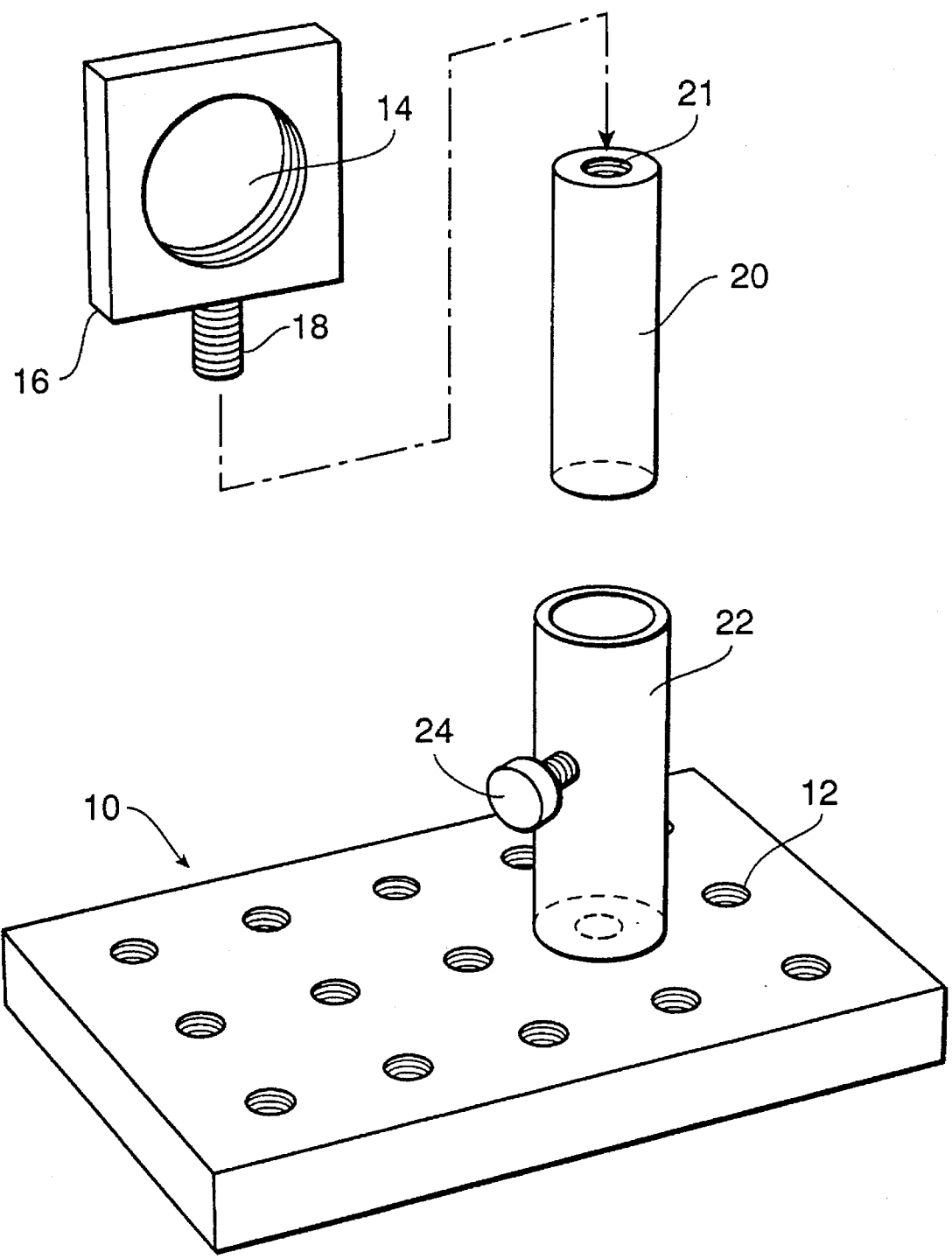
FIG. 1 is a perspective view of a contemporary device currently in use, showing a system for holding a lens, utilizing a post and post holder.

Furthermore, the clamping base 30 can be moved around the bench simply by loosening the channel screw 34. The clamp can be moved longitudinally with respect to the channel screw 34, or rotationally about the channel screw 34, without changing the threaded hole 12 (as shown in FIG. 1) that the channel screw 34 was originally screwed into. Alternatively, the channel screw 34 can be unscrewed and moved to another threaded hole 12 on the bench. Any of the above movements can be made without disturbing the attachment of the post 46 (or other device) that is mounted at the clamping end 44.

The second alternative mount shown in FIG. 2 uses a short post 48. The holder 52 may be used to hold a lens or other optical device, and is connected to the short post 48 using a screw 50 or other means known in the art. Movement of the short post 48 and holder 52 with respect to the clamp 30 is similar to that discussed for the first alternative mount above.

Figure 3:
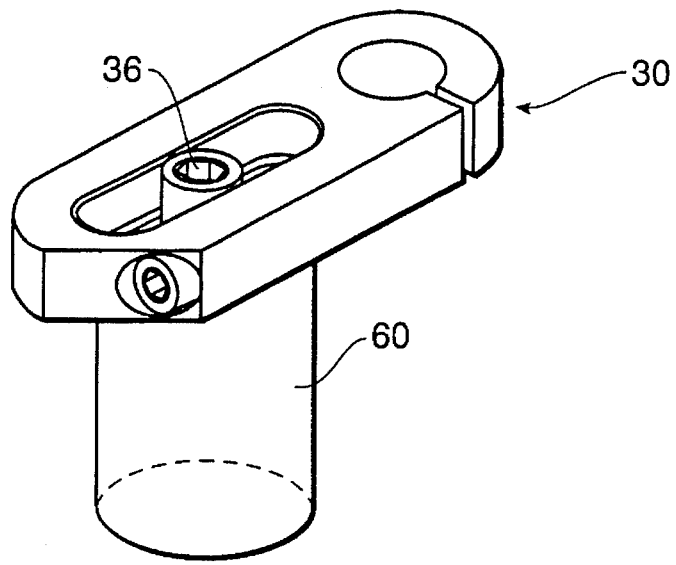
FIG. 3 is a perspective view, showing an exemplary way of using the preferred clamping base shown in FIG. 2.
Figure 4:
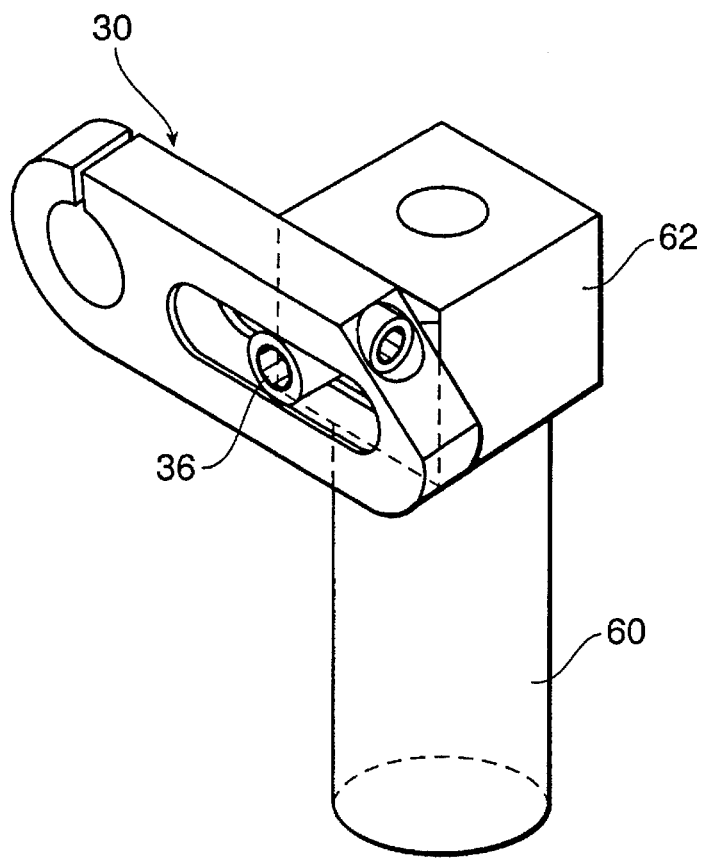
FIG. 4 is a perspective view, showing another exemplary way of using the preferred clamping base shown in FIG. 2.

FIGS. 3 and 4 illustrate ways of changing the orientation of the clamping base 30 itself, using spacers, either alone, or in combinations. FIG. 3 shows the use of the clamping base 30 connected to a single cylindrical spacer 60. In this orientation, the clamping base 30 is mounted generally horizontally and is raised vertically off of the bench, thus allowing the object under study to be correspondingly raised.

FIG. 4 shows the clamping base mounted on a combination of a cylindrical spacer 60 and a rectangular spacer 62. In this configuration, the clamping base is positioned generally horizontally and the post (not shown) would thus be in a generally horizontal position. This orientation allows an additional degree of freedom, whereby the object under study can be moved about the post's axis, or the clamping base 30 can be moved about the channel screw axis or longitudinally about with respect to the channel 34. Such movement of the clamping base 30 allows a corresponding movement of the object under study.

While embodiments of the present invention have been shown and described, various modifications may be made without departing from the scope of the present invention, and all such modifications and equivalents are intended to be covered.

I claim:

1. A clamping mechanism comprising a clamping base having an adjustment end and a clamping end, a channel in said clamping base between the adjustment and clamping ends, said channel receiving a fastener fastening said clamping base to a surface, a hole in said clamping base proximate the clamping end and having a slot through said clamping base defining a jaw, and a cavity in said clamping base extending from the adjustment end to the jaw for receiving a clamping screw, said cavity further having an opening proximate said adjustment end to allow an operator access to the cavity.

2. The clamping mechanism of claim 1, wherein said clamping base is generally in the shape of an elongated oval.

3. The clamping mechanism of claim 1, wherein said clamping base is generally in the shape of an elongated oval and said channel is longitudinal and extends from proximate the adjustment end to the clamping end.

4. The clamping mechanism of claim 3, further comprising a flange on said channel adapted to receive a fastener.

5. The clamping mechanism of claim 4, wherein said fastener is a threaded screw.

6. The clamping mechanism of claim 1, further comprising a clamping screw.

7. A clamping mechanism comprising a clamping base having an adjustment end and a clamping end, a channel in said clamping base between the adjustment and clamping ends, a fastener received in said channel fastening said clamping base to a surface, a hole in said clamping base proximate the clamping end and having a slot through said clamping base defining a jaw, a cavity in said clamping base extending from the adjustment end to the jaw, said cavity further having an opening proximate said adjustment end to allow an operator access to the cavity, and a clamping screw threadedly received in said cavity and having adjustment means proximate the adjustment end for rotating said screw to move the jaw.

8. The clamping mechanism of claim 7, wherein said clamping base is elongated, said channel is longitudinal, and said fastener is a threaded screw.

9. A method for holding an object, comprising the steps of placing a clamping base on a surface, said clamping base having an elongated body comprising an adjustment end, a clamping end, a channel therebetween adapted to receive a fastener, a hole proximate the clamping end and having a slot through said clamping base defining a jaw, and a longitudinal cavity for receiving a clamping screw, inserting and tightening a fastener received in the channel, and inserting and tightening a clamping screw to squeeze the jaw and frictionally hold an object.

\* \* \* \* \*